United States Patent Office 2,748,004
Patented May 29, 1956

2,748,004

METHOD OF INHIBITING BACTERIA, MOLD, FUNGUS, ETC., GROWTH IN CITRUS FRUITS, AND OTHER FRESH FOODS

Herman J. Keller, Dunedin, Fla., assignor, by mesne assignments, to Minute Maid Corporation, New York, N. Y., a corporation of Florida No Drawing. Application November 29, 1951, Serial No. 259,005

13 Claims. (Cl. 99—154)

The present invention relates generally to the art of preserving fresh foods from the destructive action of bacteria, mold, and other organisms for predetermined periods of time, and more particularly to a novel method of and to a novel composition for inhibiting the development of harmful organisms in citrus fruits and other freshly gathered perishable foods for a sufficiently long time to insure the delivery of sound fresh fruits and vegetables into the hands of the consumer.

The present invention is a further development in the applicant's efforts to solve the long existing problem of profitably getting Florida citrus fruits and fresh vegetables into the hands of the ultimate consumer without damage or total destruction thereof by bacteria, mold, and other organisms. It is not necessary to destroy or kill organisms destructive to fresh fruits and vegetables, requiring a treatment often harmful to product and consumer, although such a result may be highly desirable for lasting effect. It is only essential to inhibit or halt the destructive effects of destructive organisms for a sufficiently long time to insure consumption of sound products. Repeated tests on both laboratory and commercial scales demonstrate that the inhibiting of destructive effects of harmful organisms for predetermined periods of time is equivalent, for all practical purposes, of destruction of such organisms for the inhibiting period.

Hence, in brief, the present invention comprises a method of and a novel composition for inhibiting the development of destructive organisms in citrus fruits and other fresh fruits and vegetables, which are desired to be delivered to the consumer in the form as gathered, sufficiently long to insure consumption in a palatable and sound condition by the ultimate consumer. Prior to movement from a packing or processing plant, the citrus fruits, or other fresh perishables, are subjected to an atmosphere of organism inhibiting gas for a predetermined period of time which may later be repeated where shipping and selling time exceed a predetermined number of days, a time period dependent upon the specific inhibitor and food. More specifically, for citrus fruits, for example, pentachloroethane or tetrachloroethane, or either of these two as an admixture with trichloroethane, or an admixture of pentachloroethane, tetrachloroethane and trichloroethane, preferably is placed in the shipping car or truck in a container or on the floor in predetermined quantity and permitted to evaporate to envelop the individual fruit while the car is closed, the car being retained closed at least for a predetermined period in order to insure adequate inhibiting contact with the individual fruit.

Therefore, broadly, an object of the present invention is to provide a novel method of inhibiting the development or growth of destructive organisms in and on citrus fruit and other fresh perishable food for a predetermined period or periods of time which overcomes the long existing problem of getting sound products to the consumer.

Another object is to provide a novel method of treating citrus fruit and other fresh foods to inhibit the growth of destructive organisms for predetermined periods which may be simultaneously and quickly applied to large numbers of the fruit or other fresh food to effectively achieve the desired inhibition.

Another object is to provide a novel inhibitor composition for inhibiting decay organism growth in fresh perishable foods.

Another more specific object is to provide a novel method of achieving delivery of sound fresh perishables to the consumer by the application to the perishables of an organism inhibitor comprising pentachloroethane or tetrachloroethane, or one of the two as an admixture with trichloroethane, or an admixture of pentachloroethane, tetrachloroethane and trichloroethane in the gaseous form thereof.

Other objects are to provide a novel method of inhibiting the development of destructive organisms in and on citrus fruits and other fresh foods for a desired period or periods of time which is economical, practical, readily effectively used, and of widespread commercial adaptation.

Particularly, considering the present invention's application to fresh citrus fruits, by way of example, it is a well-known fact that oranges, grapefruit, tangerines, etc., are shipped from Florida and other areas where grown by rail, truck, or the like, to distant markets. Normally, it required but three to five days to move citrus fruit from the packing house in Florida to the wholesale market in New York, but delays in transit may increase the normal time by from a few hours to many days, and shipments into Canada and the western part of our country normally may consume from twelve to fourteen days which will be increased by delays, as mentioned. It is also well-known that time is required in getting the fruit into the hands of the retailer and into the hands of the ultimate consumer. Delays in wholesaling and in retailing often occur.

In one commercial adaptation of the present invention, by way of example, oranges may be treated in railroad refrigeration or other cars, or in trucks, after they have been processed, packed and stacked in the transportation medium. By treating the oranges after processing and packing, injuries sustained from staples in crating, and other injuries, receive the full benefit of the present invention. Once the oranges are in the transportation unit, such as an unrefrigerated box car, the doors and vents are closed, and a predetermined quantity of pentachloroethane or tetrachloroethane, or an admixture of either of the two with trichloroethane, or an admixture of the three compositions is placed in the car in a suitable container or is poured on the floor of the car and permitted to evaporate. The particular amount may be readily computed from the laboratory test data below. The vapor is diffused throughout the car in the normal action of gases and contacts all the fruit. The car is normally kept closed for a period of about twenty-four hours in order to insure thorough blanketing of all of the fruit by the inhibitor gases. The car is then vented to atmosphere. However, it is not necessary to vent the car, and with refrigeration or iced cars and trucks, the transportation unit is kept closed until it is desired to inspect or remove the fruit or the like.

A working formula for determining the amount of liquid pentachloroethane, tetrachloroethane, or the three admixtures, comprises from about thirty to seven cubic centimeters of any of these particular compositions per one hundred cubic feet of unoccupied space in the closed transportation unit, room, container, or the like, at substantially eighty degrees Fahrenheit temperature. The humidity may be disregarded. The concentration of gas is maintained below that which might burn the fruit. Excellent average admixtures comprise one part pentachloroethane or one part tetrachloroethane and from two to four parts trichloroethane, both by liquid weight, or one part pentachloroethane, one part tetrachloroethane, and from four to eight parts trichloroethane, all by liquid weight. In each instance, excellent decay control is achieved following application for a period of eight to fourteen days.

In addition, tetrachloroethane and its admixtures are effective degreening agents for citrus fruits and other fresh foods, such as tomatoes. When the tetrachloroethane and its admixtures are used primarily for degreening citrus fruits, an amount is fed into the standard degreening room per hour per one thousand cubic feet of unoccupied space which is from about one eighth to one-half that disclosed in the applicant's co-pending application Serial No. 4,209, filed January 24, 1948, which has issued as United States Letters Patent No. 2,577,421, December 4, 1951, the disclosure of said patent being incorporated herein by reference.

Numerous laboratory tests have been conducted employing the above-mentioned inhibitors and the inhibitor admixtures which have conclusively demonstrated the great value of the present method of achieving sound citrus fruit and other fresh fruits and vegetables in the hands of the consumer.

In one series of laboratory tests on apples at Dunedin, Florida, November 1949, room temperature and humidity, lots of 20 apples were put in 6 gallon containers with the designated amounts (below) of the designated inhibitor and sealed. The cans, including the check can, were maintained substantially sealed for 24 hours, during which time the inhibitor evaporated and blanketed the fruit, and then opened, and the fruit left exposed to room atmosphere with the following results:

| Gas and Amount | 2 days | 4 days | 7 days | 10 days |
|---|---|---|---|---|
| Tetrachloroethane (½ cc.) | 20 good / No rots | 20 good / No rots | 19 good / 1 rot | 19 good / 1 rot |
| Pentachloroethane (½ cc.) | 20 good / No rots | 20 good / No rots | 20 good / No rots | 20 good / No rots |
| Tetrachloroethane (¼ cc.), Trichloroethane (¾ cc.) | 20 good / No rots | 20 good / No rots | 19 good / 1 rot | 18 good / 2 rots |
| Pentachloroethane (¼ cc.), Trichloroethane (¾ cc.) | 20 good / No rots | 20 good / No rots | 20 good / No rots | 20 good / No rots |
| Tetrachloroethane (⅛ cc.), Pentachloroethane (⅛ cc.), Trichloroethane (¾ cc.) | 20 good / No rots | 20 good / No rots | 19 good / No rots | 19 good / 1 rot |
| Checks | 19 good / 1 rot | 18 good / 2 rots | 15 good / 5 rots | 12 good / 8 rots |

In another series of laboratory tests on oranges at Dunedin, Florida, November 1950, room temperature and humidity, lots of 30 oranges were put in 6 gallon containers with designated amounts of the designated inhibitor (below) and sealed. All oranges were from the same grove. The cans, including the check can, were maintained substantially sealed for 24 hours during which time the inhibitors evaporated, and then opened and the fruit left exposed to room atmosphere with the following results:

| Gas and Amount | 2 days | 4 days | 7 days | 10 days |
|---|---|---|---|---|
| Tetrachloroethane (½ cc.) | 30 good / No rots | 30 good / No rots | 28 good / 2 rots | 27 good / 3 rots |
| Pentachloroethane (½ cc.) | 30 good / No rots | 30 good / No rots | 30 good / No rots | 29 good / 1 rot |
| Tetrachloroethane (¼ cc.), Trichlorethane (¾ cc.) | 30 good / No rots | 30 good / No rots | 28 good / 2 rots | 27 good / 3 rots |
| Pentachloroethane (¼ cc.), Trichloroethane (¾ cc.) | 30 good / No rots | 30 good / No rots | 29 good / 1 rot | 28 good / 2 rots |
| Tetrachloroethane (⅛ cc.), Pentachloroethane (⅛ cc.), Trichloroethane (¾ cc.) | 30 good / No rots | 30 good / No rots | 28 good / 2 rots | 27 good / 3 rots |
| Checks | 28 good / 2 rots | 24 good / 6 rots | 19 good / 11 rots | 14 good / 16 rots |

The observations were made the indicated number of days after the start of the tests in both series.

It is apparent that there have been provided a novel method of and composition for inhibiting the development of harmful organisms in citrus fruits and other perishable foods which fulfill the objects and advantages sought therefor.

It is to be understood that the foregoing description has been given by way of illustration and example. It is also to be understood that substitution of equivalent steps and rearrangement of steps, which will be readily apparent to one skilled in the art, are contemplated as within the scope of the present invention which is limited only by the claims which follow.

What is claimed is:

1. A method of inhibiting the development of destructive organisms in fruits and vegetables including citrus fruit comprising the step of subjecting the same at least about twenty-four hours in a closed space to an atmosphere containing a member of the group consisting of tetrachloroethane and pentachloroethane gas, wherein the concentration for each one hundred cubic feet of unoccupied space ranges from about 30 to 70 cubic centimeters of liquid for said member.

2. A method of inhibiting the development of destructive organisms in fruits and vegetables including citrus fruit comprising the step of subjecting the same at least about twenty-four hours in a closed space to an atmosphere containing an admixture of trichloroethane, and at least one member of the group consisting of pentachloroethane and tetrachloroethane gases, wherein the concentration for each one hundred cubic feet of unoccupied space ranges from about 30 to 70 cubic centimeters of liquid for said admixture.

3. A method of inhibiting the development of destructive organisms in fruits and vegetables including citrus fruit comprising the step of subjecting the same for at least about twenty-four hours in a closed space to an atmosphere containing an admixture of two to four parts by liquid weight of trichloroethane and one part by total weight of at least one member of the group consisting of pentachloroethane and tetrachloroethane gases.

4. A method of inhibiting the development of destructive organisms in fruits and vegetables including citrus fruit comprising the step of subjecting the same for at least about twenty-four hours in a closed space to an atmosphere containing an admixture to two to four parts by liquid weight of trichloroethane and one part by total weight of at least one member of the group consisting of pentachloroethane and tetrachloroethane gases wherein the concentration for each one hundred cubic feet of unoccupied space ranges from about 30 to 70 cubic centimeters of liquid for said admixture.

5. An inhibitor for inhibiting for a period of time the development of destructive organisms in fruits and vegetables including citrus fruit comprising an admixture of tetrachloroethane and trichloroethane, the concentration thereof being sufficient to effect substantial inhibition of destructive organism growth and varying from about two to four parts by liquid weight of trichloroethane to one part of tetrachloroethane.

6. An inhibitor for inhibiting for a period of time the development of destructive organisms in fruits and vegetables including citrus fruit comprising an admixture of substantially one part tetrachloroethane and substantially three parts trichloroethane, both by liquid weight.

7. An inhibitor for inhibiting for a period of time the development of destructive organisms in fruits and vegetables including citrus fruit comprising an admixture of pentachloroethane and trichloroethane, the concentration thereof being sufficient to effect substantial inhibition of destructive organism growth and varying from about two to four parts by liquid weight of trichloroethane to one part of pentachloroethane.

8. An inhibitor for inhibiting for a period of time the development of destructive organisms in fruits and vegetables including citrus fruit comprising an admixture of substantially one part pentachloroethane and substantially three parts trichloroethane, both by liquid weight.

9. An inhibitor for inhibiting for a period of time the development of destructive organisms in fruits and vegetables including citrus fruit comprising an admixture of pentachloroethane, tetrachloroethane and trichloroethane, the concentration thereof being sufficient to effect substantial inhibition of destructive organism growth and varying from about two to four parts by liquid weight of trichloroethane to one part of tetrachloroethane and pentachloroethane by combined weight.

10. An inhibitor for inhibiting for a period of time the development of destructive organisms in fruits and vegetables including citrus fruit comprising an admixture of substantially one part pentachloroethane, one part tetrachloroethane, and six parts trichloroethane.

11. An inhibitor for inhibiting for a period of time the development of destructive organisms in fruits and vegetables including citrus fruit comprising an admixture of substantially three parts trichloroethane and one part by weight of at least one member of the group consisting of tetrachloroethane and pentachloroethane, all by liquid weight.

12. An inhibitor for inhibiting for a period of time the development of destructive organisms in fruits and vegetables including citrus fruit comprising an admixture of about two to four parts of trichloroethane and one part by total weight of at least one member of the group consisting of tetrachloroethane and pentachloroethane, all by liquid weight.

13. An inhibitor for inhibiting for a period of time the development of destructive organisms in fruits and vegetables including citrus fruits comprising an admixture of trichloroethane and at least one member of the group consisting of tetrachloroethane and pentachloroethane, the concentration thereof being sufficient to effect substantial inhibition of destructive organism growth and varying from about two to four parts by liquid weight of trichloroethane to one part of tetrachloroethane and pentachloroethane by combined weight.

References Cited in the file of this patent
UNITED STATES PATENTS 2,577,421   Keller _____ Dec. 4, 1951